(12) United States Patent
Yamanaka et al.

(10) Patent No.: US 6,487,337 B1
(45) Date of Patent: Nov. 26, 2002

(54) MOVING MECHANISM HAVING A POSITIONING MECHANISM AND ELECTRONIC DEVICE WITH THE MOVING MECHANISM

(75) Inventors: Takashi Yamanaka, Chiba (JP); Akihiro Iino, Chiba (JP)

(73) Assignee: Seiko Instruments Inc. (JP)

( * ) Notice: Subject to any disclaimer, the term of this patent is extended or adjusted under 35 U.S.C. 154(b) by 201 days.

(21) Appl. No.: 09/698,683

(22) Filed: Oct. 27, 2000

(51) Int. Cl.⁷ .............................. G02B 6/26; H01L 41/06
(52) U.S. Cl. .............................. 385/25; 385/15; 385/16; 385/137; 385/138; 310/322; 310/323.03; 310/334; 310/348
(58) Field of Search ............................... 385/15, 16, 17, 385/18, 19, 25, 26, 147, 134, 136, 137, 138; 310/322, 323.03, 334, 348

(56) References Cited

U.S. PATENT DOCUMENTS

| | | | | |
|---|---|---|---|---|
| 5,157,745 A | * | 10/1992 | Ames ........................... | 385/25 |
| 5,445,154 A | * | 8/1995 | Larson et al. ................ | 600/459 |
| 5,682,447 A | * | 10/1997 | Kuzyk et al. ................ | 356/480 |
| 5,852,336 A | * | 12/1998 | Takagi ..................... | 310/323.01 |
| 6,362,557 B1 | * | 3/2002 | Gruber et al. ......... | 310/323.02 |

* cited by examiner

Primary Examiner—Brian Healy
(74) Attorney, Agent, or Firm—Adams & Wilks (57) ABSTRACT

In a moving mechanism, a contact is disposed on a moving body, and the contact is in contact with a positioning member so as to move the moving body by 180 degrees. With this structure, the accurate regulation of the position of the moving body can be realized with only a slight improvement in the conventional moving mechanism, and the object can be inexpensively realized. Also, since the position detecting means, the signal processing means, etc., are not required other than the moving mechanism, necessary and sufficient functions can be realized with the minimum structure without requiring excessive energy and space.

11 Claims, 7 Drawing Sheets

MOVING MECHANISM HAVING A POSITIONING MECHANISM AND ELECTRONIC DEVICE WITH THE MOVING MECHANISM

BACKGROUND OF THE INVENTION

1. Field of the Invention

The present invention relates to a moving mechanism and an electronic device with the moving mechanism, and more particularly to a moving mechanism characterized in that a positioning mechanism is disposed on a moving body and an electronic device with such a moving mechanism.

2. Description of the Related Art

Up to now, there has been known a moving mechanism provided with an actuator that rotates a moving body in response to a signal emitted from a drive circuit. For example, a drive signal of a given frequency is produced by a variable transmitter and then applied to a piezo-electric vibrator (piezoelectric element) through a power amplifier, to thereby allow the piezo-electric vibrator to generate an oscillatory wave. Also, the piezo-electric vibrator transmits the oscillatory wave to a vibrating body which is formed of an elastic body to which the piezo-electric vibrator is joined, and a substance which is in contact with the elastic body under a given pressure, that is, an ultrasonic motor that operates the moving body is exemplified as a conventional moving mechanism with that actuator (for example, refer to Japanese Patent Application Laid-open No. Hei 8-251952).

However, in the conventional moving mechanism thus structure, although a driving force that allows the moving body to move in a given direction can be obtained, because there exists no means for detecting a position of the moving body or regulating the moving amount, the position of the moving body cannot be accurately fixed at a given position.

Also, there has been proposed a method in which positional information is detected by an encoder or the like to control the actuator as means for accurately detecting and regulating the position of the moving body. However,the encoder per se is expensive, and also in order to move the moving body to a desired position, means for processing the positional information outputted from the encoder and means for controlling the actuator are required, thereby leading to a circumstance in which the device is not prevented from being complicated or large-sized and the product price is not prevented from rising.

SUMMARY OF THE INVENTION

The present invention has been made to eliminate the above problems, and therefore an object of the present invention is to obtain a moving mechanism which is capable of accurate positioning with a simple structure without using detecting means such as an encoder.

In order to achieve the above object, according to the present invention, there is provided a moving mechanism, comprising: an actuator that rotates a moving body; a support plate having said actuator; a positioning member disposed on said support member; a first contact disposed on said moving body; and a second contact disposed on said moving body; wherein said first contact and said positioning member are in contact with each other when said moving body rotates clockwise, said second contact and said positioning member are in contact with each other when said moving body rotates counterclockwise, and a movement angle, between a position at which said first contact of said moving body and said positioning member are in contact with each other and a position at which said second contact of said moving body and said positioning member are in contact with each other, is 180 degrees.

According to the above structure, because the accurate regulation of the position of the moving body can be realized with only a slight improvement in the conventional moving mechanism, the above object can be achieved inexpensively, resulting in a high economical effect. Also, since the position detecting means, the signal processing means, etc., are not required other than the moving mechanism, necessary and sufficient functions are provided without requiring excessive energy and space.

In addition, with the structure in which the moving direction of the moving body is merely made variable, the positioning of 180 degrees is enabled, and the sure positioning can be made under simple control.

Also, according to the present invention, in the above moving mechanism, a sensor that senses the movements of said positioning member and said moving body is disposed on said positioning member or said moving body.

According to the above structure, the completion of the positioning of the moving body can be accurately sensed with the results that the useless use of an energy is suppressed, and the moving body and the contacts are prevented from being deteriorated due to the useless movement, thereby being capable of improving the durability.

Also, according to the present invention, in the above moving mechanism, an ultrasonic motor is used for said actuator.

According to the above structure, a retaining torque is provided even at the time of the non-energization of the ultrasonic motor, thereby being capable of realizing a power saving structure which does not require a power for retaining the position of the moving body when the positioning of the moving body is completed. Also, since the ultrasonic motor is different in operating principle from the electromagnetic actuator which has been frequently employed up to now, a structure which has not been found up to now such that the thinning of the device in the direction of a rotating axis can be expected can be realized.

In addition, since the torque is large as compared with the electromagnetic actuator of the same volume, the downsizing of the device can be realized.

Further, according to the present invention, in said moving mechanism, at least one optical fiber that penetrates said moving body and projects toward said support plate side is disposed on said moving body, at least one optical fiber that projects toward said moving body side is disposed on said support plate, and an optical path that passes through the optical fiber disposed on said moving body and the optical fiber disposed on said support plate is changed by the movement of said moving body.

According to the above structure, the position of the optical fiber disposed on the moving body is changed in accordance with the rotation of the moving body, thereby being capable of completing a switch mechanism that selects the combination of the lights that pass through the optical fiber disposed on the moving body and the optical fiber disposed on the support plate. In particular, for example, in the case where a plurality of optical fibers are provided such that two optical fibers are disposed on each of the support plate and the moving body, there is obtained an excellent feature that the combination of plural pairs of optical fibers can be changed at the same time in accordance with the movement of one moving body.

Further, according to the present invention, there is provided an electronic device including the above moving mechanism therein, wherein a power is supplied to the actuator that constitutes the moving mechanism from a power supply disposed within the device, and the driving of the actuator is controlled by a control section.

The electronic device includes all of electronic devices to which the moving mechanisms of an optical switch, a measuring device, various light source generating devices such as a laser beam generating device, a light receiving device, a communication switching device, an optical circuit, etc., are applicable.

According to the present invention, with the above structure, the electronic device with the moving mechanism capable of positioning the moving body can be realized.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to FIGS. 1 to 7.

First Embodiment

Figure 1:
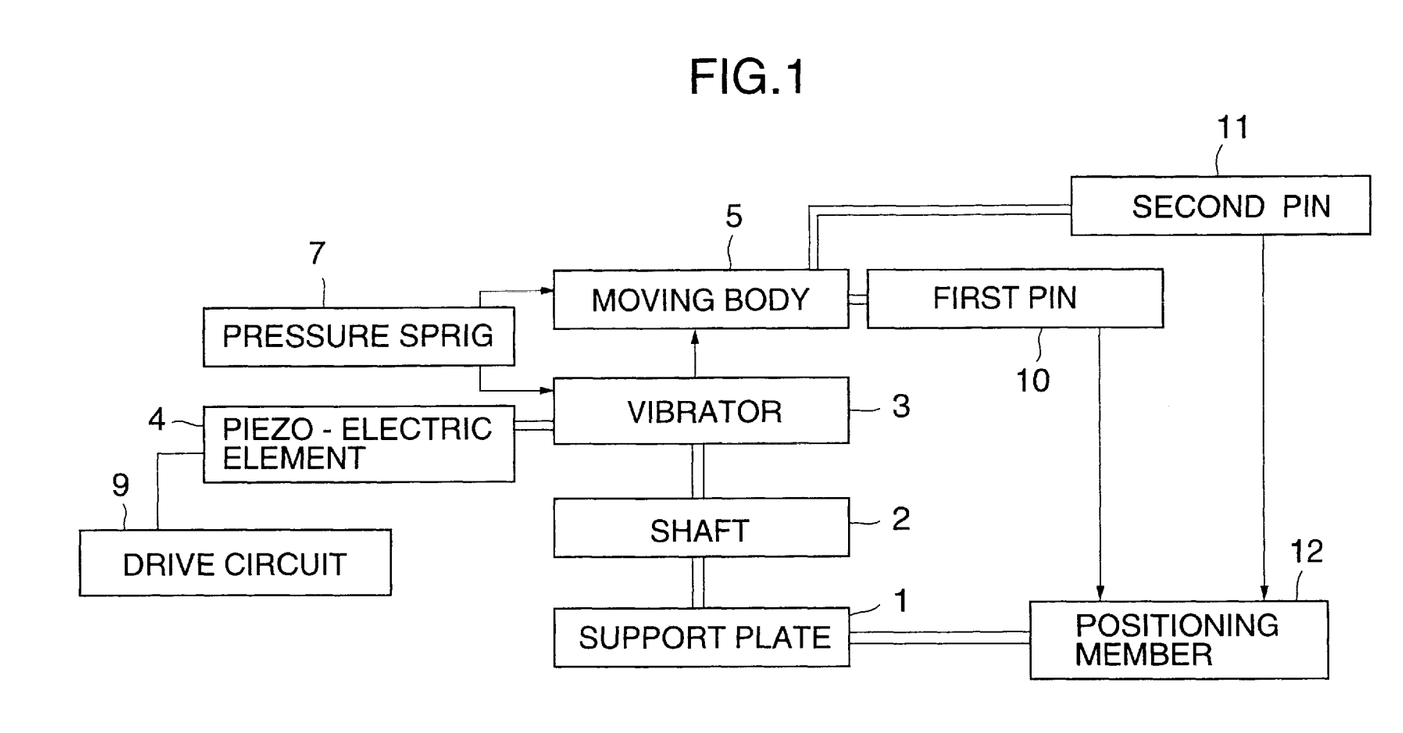
FIG. 1 is a block diagram showing a moving mechanism in accordance with a first embodiment of the present invention.
Figure 2A:
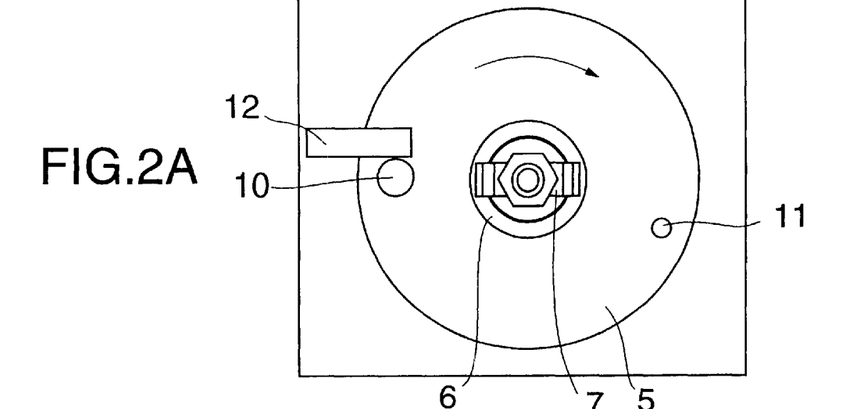
FIG. 2 is a specific structural diagram showing the moving mechanism in accordance with the first embodiment of the present invention.
Figure 2B:
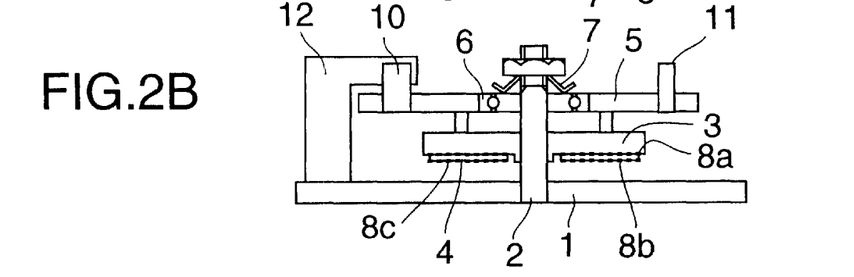
Figure 2C:
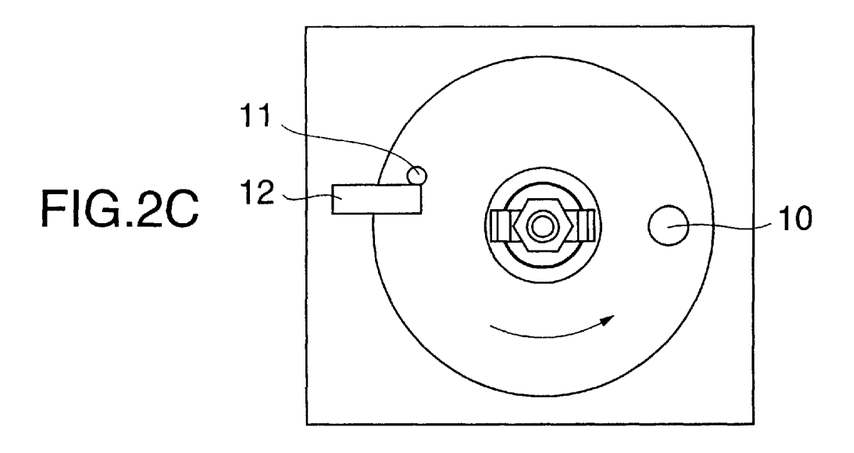

FIG. 1 is a block diagram showing a moving mechanism in accordance with a first embodiment of the present invention, and FIG. 2 is a specific structural diagram showing the moving mechanism.

As shown in FIGS. 1 and 2, an actuator that constitutes the moving mechanism of the present invention is formed of an ultrasonic motor, and the ultrasonic motor includes a support plate 1, and a shaft 2 erected from the support plate 1 is equipped with a vibrator 3 and a moving body 5. The vibrator 3 is joined to a piezo-electric element 4 both surfaces of which are subjected to electrode patterns 8a, 8b and 8c.

The support plate 1 has a hole from which the shaft 2 is erected and is fixed with a pressure spring 7 through a support member and also fixed with a positioning member 12.

The shaft 2 penetrates the hole of the support plate 1, and the vibrator 3 is fixed to a portion where the shaft 2 penetrates.

The moving member 5 is so structured as to be rotatable about the shaft 2 as a center, and a first pin 10 as a first contact and a second pin 11 as a second contact are joined to the moving body 5. The moving body 5 is pushed toward the vibrator 3 by the pressure spring 7 under a given pressure. A manner of joining the pins 10 and 11 to the moving body 5 is not limited so far as it is not out of the subject matter of the present invention, and for example, means such as press fitting, adhesion or screwing may be employed.

According to this embodiment, when a given drive signal is supplied to the piezo-electric element 4 by a drive circuit 9 to rotate the moving body 5 clockwise, since the first pin 10 and the positioning member 12 come in contact with each other at a predetermined position, the moving body 5 can be positioned with a simple structure and with a high reproducibility.

In addition, when the moving body 5 is rotated counterclockwise, the second pin 11 and the positioning member 12 come in contact with each other, thereby being capable of positioning the moving body 5 with high accuracy at the second position.

In particular, in this structure, the positional relationship between the first pin 10 and the second pin 11 is devised, and an angle of movement of the moving body 5 is set to 180 degrees regardless of the clockwise or counterclockwise movement.

The most significant feature of this embodiment resides in that the rotating direction of the moving body 5 is thus changed whereby the moving body 5 is surely made movable by 180 degrees.

In this structure, the ultrasonic motor having the ultrasonic vibration as its drive source is employed as the actuator that constructs the moving mechanism. However, the drive source of the actuator is not limited as far as it is not out of the subject matter of the present invention. The actuator includes an electromagnetic actuator or an electromagnetic motor which has an electromagnetic force as the drive source, an electrostatic motor that has an electrostatic force as the drive force, a shape memory alloy actuator that has a deforming force of shape memory alloy as the drive force, etc.

Also, in this embodiment, the first pin 10, the second pin 11, and the moving body 5 are formed of different members, respectively. However, a part or all of those members may be integrally molded.

Also, when the members that constitute the first pin 10 and the second pin 11 are made of a hard material such as metal or ceramics or plastic excellent in sliding property, the precision and the durability are further improved. Also, in this structure, the first pin 10, the second pin 11 and the positioning member 12 are in contact with a surface of the moving body 5 opposite to the support plate 1. However, the respective positions are not limited so far as it is not out of the subject matter of the present invention.

For example, the respective members may be in contact with the moving body 5 at the support plate 1 side to reduce the thickness of the device in the direction of the shaft 2, or the respective members may be disposed on the outer periphery of the moving body 5 to further enhance an angular precision. Also, the system of driving the vibrator 3 in order to move the mobbing body 5 is not limited, and any one of a progressive wave or a standing wave may be employed. Also, the configuration of the moving body 5 is not limited to a circle, but the configuration is not limited so far as the structure necessary for the present invention can be realized. Further, the method of joining the first pin 10 and the second pin 11 is not limited so far as it is not out of the subject matter of the present invention, but a method such as press fitting, adhesion or screwing may be used.

As described above, according to this embodiment, the moving mechanism having the positioning function at a specific position with a high reproducibility can be realized with a simple structure that is high in productivity.

Second Embodiment

Figure 3A:
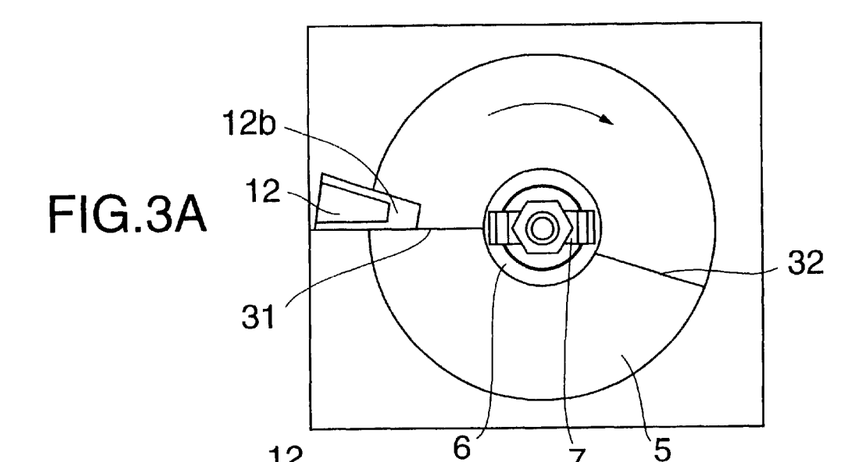
FIG. 3 is a specific structural diagram showing a moving mechanism in accordance with a second embodiment of the present invention.
Figure 3B:
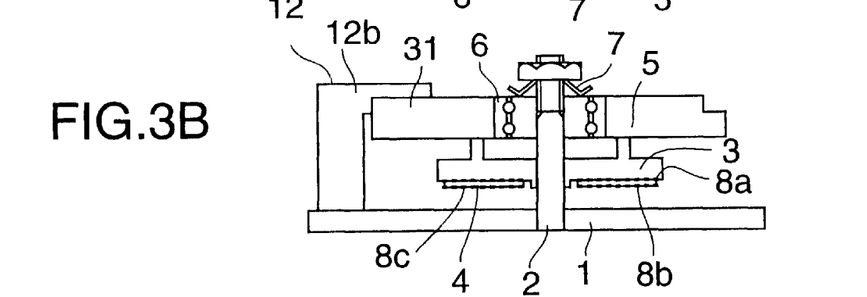
Figure 3C:
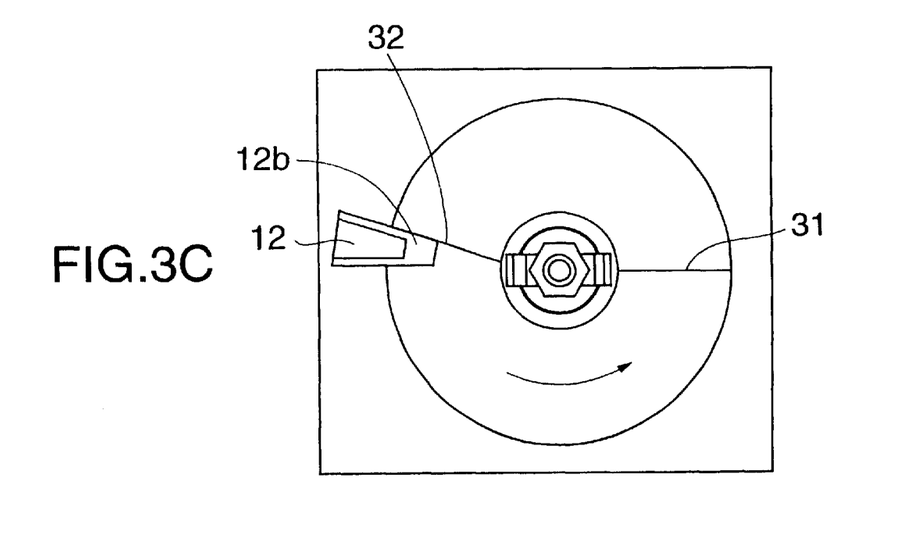

FIG. 3 is a specific structural diagram showing a moving mechanism in accordance with a second embodiment of the present invention.

This embodiment is basically identical with the first embodiment except that the moving body 5 has a first step portion 31 and a second step portion 32 to constitute a contact which is in contact with the positioning member 12, thereby regulating the movement of the moving body 5. With this structure, the rotating direction of the moving body 5 is changed, thereby being capable of surely moving the moving body 5 by 180 degrees, as in the first embodiment. In addition, the positioning member 12 is equipped with a sensor 12b that detects that the positioning of the moving body 5 is completed.

According to this embodiment, since the moving body 5 can be manufactured by injection molding or the like, the productivity is high, the economical effect is high and the entire structure is thinned.

In addition, since the sensor 12b is disposed on the positioning member 12, the completion of positioning can be sensed, the transmission of the drive signal to the vibrator 5 can be cut out at an accurate timing, and an excessive consumption of energy can be suppressed. In Addition, because the useless movement of the vibrator 3 can be suppressed, the deterioration of the lifetime due to abrasion can be prevented.

In this embodiment, if the sensor 12b can discriminate the positional relationship between the moving body 5 and the positioning member, the kind of the sensor 12b is not limited. For example, the above-described action can be obtained if a contact pressure applied to the positioning member 12 is detected by using a pressure sensor, the vibrations applied to the positioning member 12 is detected by using a vibration sensor, a strain applied to the positioning member 12 is detected by using a strain gauge, or the position is optically detected by using a photosensor. Also, a contact of the first pin 10 and the second pin 11 with the positioning member 12 may be detected by an electric contact to detect the completion of positioning.

Also, in this structure, the first step portion 31 is provided as the first contact and the second step portion 32 is provided as the second contact. However, the means that constitute the contacts are not limited, and the configuration of the contacts is not also limited if it is of the configuration that constitutes the subject matter of the present invention.

Also, when the members that constitute the first step portion 31 and the second step portion 32 are made of a hard material such as metal or ceramics or plastic excellent in sliding property, its precision and its durability are further improved.

As described above, according to this embodiment, the moving mechanism having the positioning function at a specific position with a high reproducibility can be realized with a simple structure that is high in productivity.

Third Embodiment

Figure 4A:
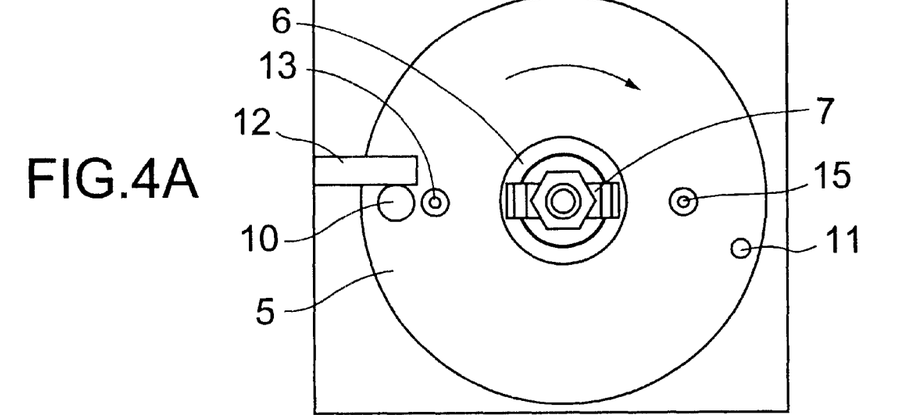
FIG. 4 is a specific structural diagram showing a moving mechanism in accordance with a third embodiment of the present invention.
Figure 4B:
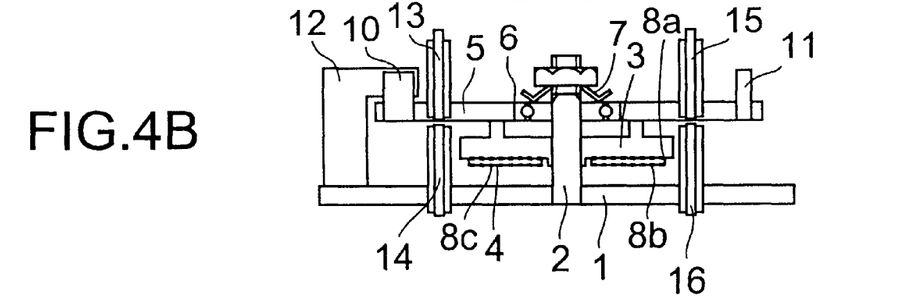
Figure 4C:
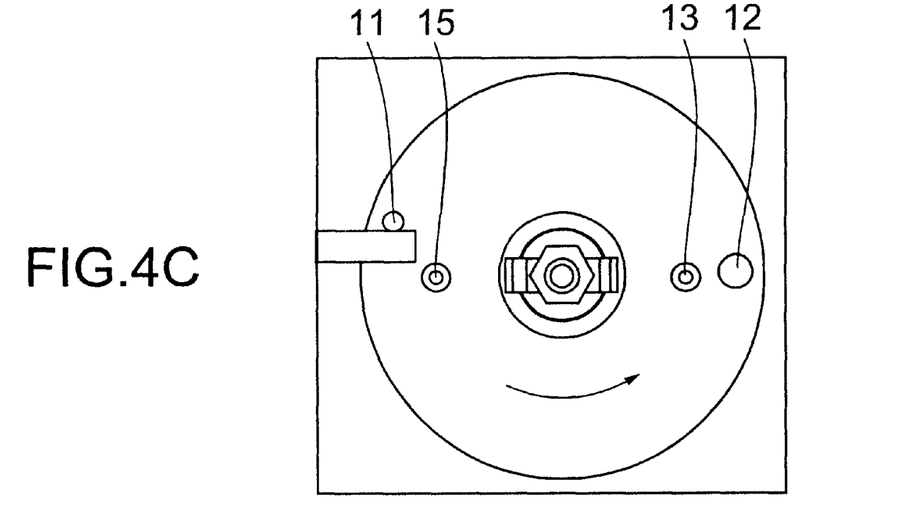

FIG. 4 is a specific structural diagram showing a moving mechanism in accordance with a third embodiment of the present invention.

This embodiment is basically identical with the first embodiment and the second embodiment except that two holes are defined in the moving body 5 and fitted with optical fibers 13 and 15, respectively, and optical fibers 14 and 16 to be positioned are disposed on the support plate 1 at the respective corresponding positions.

The moving body 5 is so limited as to move within a range of 180 degrees by the first pin 10 that forms the first contact, the second pin 11 that forms the second contact and the positioning member 12, and the holes defined in the moving body and the optical fibers to be positioned positionally coincide with each other at a position which is the limited end portion. With this structure, when the rotating direction of the moving body is changed, the combination of the light that pass through the optical fibers 13, 15 fixed in the holes of the moving body 5 and the optical fibers 14, 16 to be supported can be changed, thereby being capable of structuring a so-called photo-switch.

In particular, in this embodiment, because two pairs of optical fibers 14 and 16 to be supported are provided, the combination of those two optical fibers can be changed by the movement of one moving body at the same time, thereby being capable of eliminating a time lag between a plurality of switches which is a problem caused when the plurality of switches are converted.

Also, the number of optical fibers is arbitrary, and for example, if one optical fiber is disposed on the moving body 5 and two optical fibers are disposed on the support plate 1, a photo switch that selects the light that passes through the optical fiber fixed to the moving body can be structured. In addition, for example, if four optical fibers are disposed on the moving body 5 and four optical fibers are disposed on the support plate 1, a change in the optical paths that pass through four pairs of optical fibers at the same time can be realized by the operation of one moving mechanism.

Also, the configuration of the moving body is not limited to a circle, but the configuration is not limited so far as the structure necessary for the present invention can be realized.

Fourth Embodiment

Figure 5:
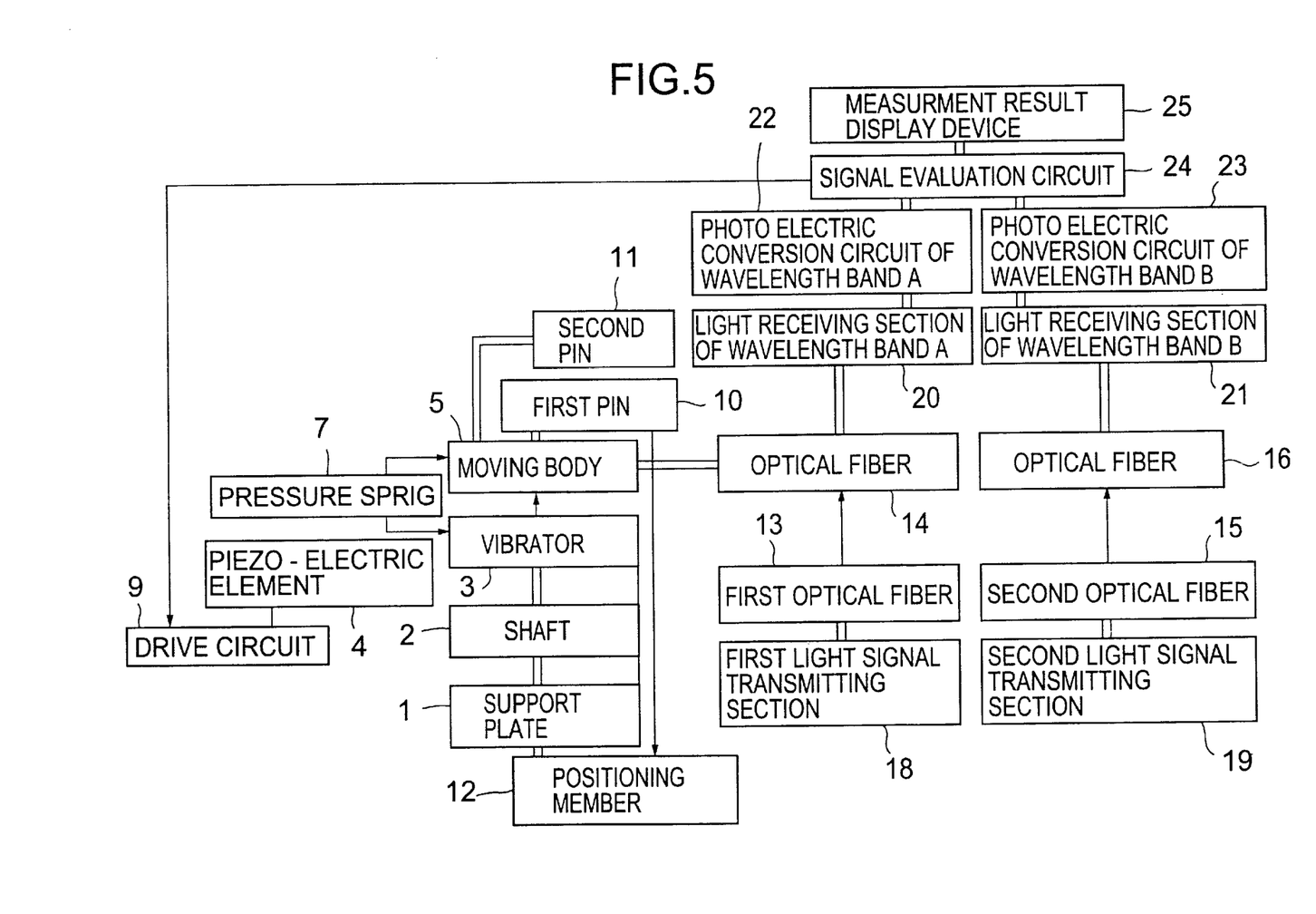
FIG. 5 is a block diagram showing an electronic device with the moving mechanism in accordance with an embodiment of the present invention.
Figure 6:
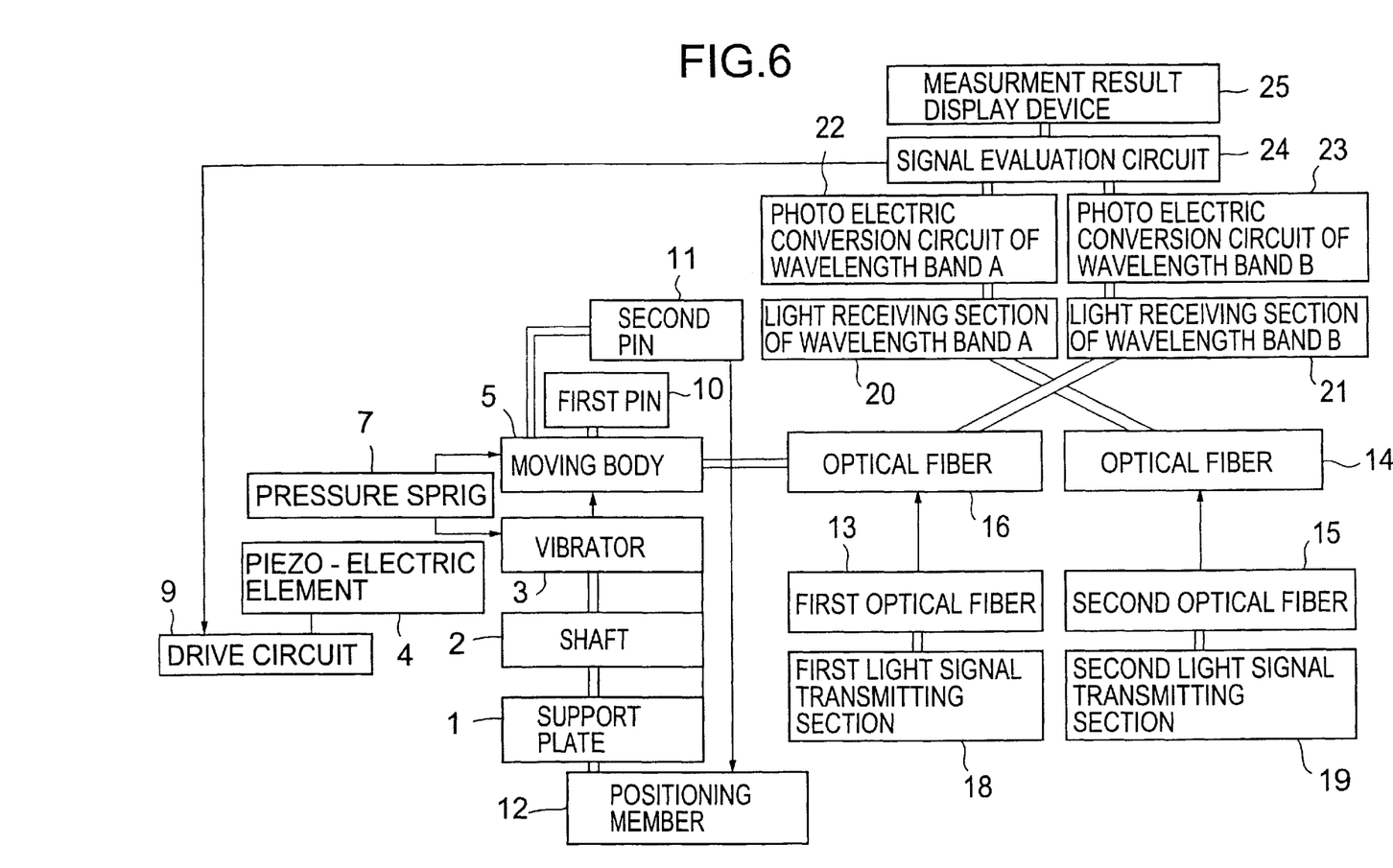
FIG. 6 is a block diagram showing an electronic device with the moving mechanism in accordance with an embodiment of the present invention.
Figure 7:
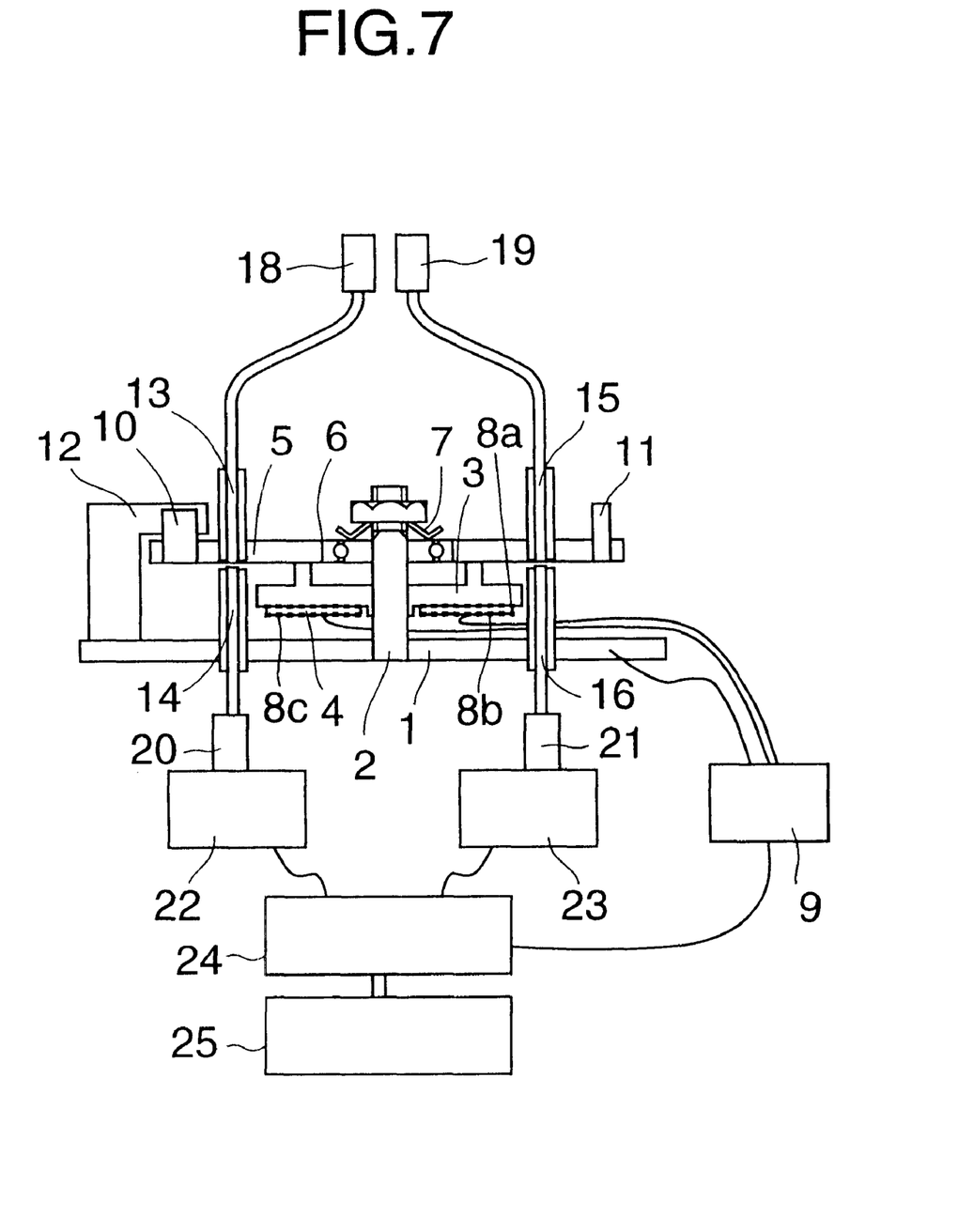
FIG. 7 is a specific structural diagram showing an electronic device with the moving mechanism in accordance with an embodiment of the present invention.

FIGS. 5 and 6 are block diagrams showing an electronic device with the moving mechanism in accordance with a fourth embodiment of the present invention, and FIG. 7 is a specific structural diagram of the electronic device.

As shown in FIGS. 5, 6 and 7, this embodiment is directed to a light signal characteristic measuring device having the moving mechanism described in the third embodiment. This device is characterized in that a light signal that conducts the characteristic measurement is separated into wavelength bands A and B and then measured, whereby a photoelectric conversion circuit adjusted so as to conduct the measurement in the respective wavelength bands with precision is disposed, and its switching operation is automatically conducted, to thereby realize a device which enables the measurement in a plurality of wavelength bands with precision.

In particular, this measuring device includes a photo-switch of the present invention therein, and two holes are defined in the moving body 5 and the optical fibers 13 and 15 are fixed at the respective holes, and the optical fibers 14 and 16 to be positioned are disposed on the support plate 1 at the respective positions.

Like FIG. 4, the moving body 5 is so limited as to move within a range of 180 degrees by the first pin 10 that forms the first contact, the second pin 11 that forms the second contact and the positioning member 12, and the holes defined in the moving body and the optical fibers to be positioned positionally coincide with each other at a position which is the limited end portion. With this structure, when the rotating direction of the moving body is changed, the combination of the light that pass through the optical fibers 13, 15 fixed in the holes of the moving body 5 and the optical fibers 14, 16 to be supported can be changed.

In a state (FIG. 5) where the first pin 10 is in contact with the positioning member 12, a first light signal to be measured is made incident from a first light signal transmitting section 18. The incident light signal reaches a light receiving section 20 of the wavelength band A through the first optical fiber 13 and the optical fiber 14 which is paired with the first optical fiber, and the signal is transmitted to a photoelectric conversion circuit 22 of the wavelength band A. The result of the wavelength band A from the photoelectric conversion circuit 22 is transmitted to a signal evaluation circuit 24.

The signal evaluation circuit 24 that has obtained the signal evaluation result of the wavelength band A sends the signal to the drive circuit 9 to drive the moving body 5 so as to change the optical path (FIG. 6). Then, the first light signal reaches the light receiving section 21 of the wavelength band B, and the signal is transmitted to the photoelectric conversion circuit 23 of the wavelength band B. When the result of the wavelength band B from the signal processing circuit 23 is transmitted to the signal evaluation circuit 24, the first light signal is used to evaluate the characteristics of the wavelength bands A and B, and the evaluation results are totaled and transmitted to a measurement result display device 25 from the signal evaluation circuit 24, whereby the user of this measuring device can grasp the characteristic of the first light signal.

Similarly, when the second light signal is transmitted from the second light signal transmitting section 19, the first light signal and the second light signal can be evaluated at the same time in a reverse procedure to the first light signal.

In this embodiment, the signal is transmitted from the optical fiber on a surface side of the support plate 1 which faces the vibrator 3. Alternatively, the signal may be transmitted from the optical fiber on a surface side of the support plate 1 that does not face the vibrator 3.

Also, this is an effective mechanism even if the light transmission/reception without a signal is made.

Further, this embodiment is directed to the measuring device pertaining to the characteristic evaluation of the light signal, but is not limited thereto so far as it is not out of the subject matter of the present invention. Also, in this embodiment, a plurality of photoelectric conversion circuits are employed, but only one circuit may be used.

Further, a method of displaying the evaluation result with this measuring device is not limited to this embodiment if the user can grasp the characteristic, but the display on CRT or liquid crystal screen, printing on a paper, an output of an electric signal, etc. are also included as the display method.

As was described above, according to the moving mechanism of the present invention, the accurate regulation of the position of the moving body can be realized with only a slight improvement in the conventional moving mechanism, and the economical moving mechanism that achieves the object inexpensively can be realized. Also, since the position detecting means, the signal processing means, etc., are not required other than the moving mechanism, necessary and sufficient functions are provided without requiring excessive energy and space.

Also, according to the moving mechanism of the present invention, above structure, the completion of the positioning of the moving body can be accurately sensed with the results that the useless use of an energy is suppressed, and the moving body and the contacts are prevented from being deteriorated due to the useless movement, thereby being capable of improving the durability.

Further, according to the moving mechanism of the present invention, a retaining torque is provided even at the time of the non-energization of the ultrasonic motor, thereby being capable of realizing a power saving structure which does not require a power for retaining the position of the moving body when the positioning of the moving body is completed. Also, since the ultrasonic motor is different in operating principle from the electromagnetic actuator which has been frequently employed up to now, a structure which has not been found up to now such that the thinning of the device in the direction of a rotating axis can be expected can be realized.

In addition, since the torque is large as compared with the electromagnetic actuator of the same volume, the downsizing of the device can be realized.

Still further, according to the moving mechanism of the present invention, the position of the optical fiber disposed on the moving body is changed in accordance with the rotation of the moving body, thereby being capable of completing a switch mechanism that selects the combination of the light that pass through the optical fiber disposed on the moving body and the optical fiber disposed on the support plate. In particular, for example, in the case where a plurality of optical fibers are provided such that two optical fibers are disposed on each of the support plate and the moving body, there is obtained an excellent feature that the combination of plural pairs of optical fibers can be changed at the same time in accordance with the movement of one moving body.

Yet still further, according to the moving mechanism of the present invention, an electronic device with the moving mechanism which is capable of positioning the moving body can be realized.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A moving mechanism, comprising:
   an actuator that rotates a moving body;
   a support plate having said actuator;
   a positioning member disposed on said support member;
   a first contact disposed on said moving body; and
   a second contact disposed on said moving body;
   wherein said first contact and said positioning member are in contact with each other when said moving body rotates clockwise;
   wherein said second contact and said positioning member are in contact with each other when said moving body rotates counterclockwise; and
   wherein a movement angle, between a position at which said first contact of said moving body and said positioning member are in contact with each other and a position at which said second contact of said moving body and said positioning member are in contact with each other, is 180 degrees.

2. The moving mechanism as claimed in claim 1, wherein a sensor that senses the movements of said positioning member and said moving body is disposed on said positioning member or said moving body.

3. The moving mechanism as claimed in claim 1, wherein said actuator comprises an ultrasonic motor.

4. The moving mechanism as claimed in claim 2, wherein said actuator comprises an ultrasonic motor.

5. The moving mechanism as claimed in claim 1, wherein at least one optical fiber that penetrates said moving body and projects toward said support plate side is disposed on said moving body, at least one optical fiber that projects toward said moving body side is disposed on said support plate, and an optical path that passes through the optical fiber disposed on said moving body and the optical fiber disposed on said support plate is changed by the movement of said moving body.

6. The moving mechanism as claimed in claim 2, wherein at least one optical fiber that penetrates said moving body and projects toward said support plate side is disposed on said moving body, at least one optical fiber that projects toward said moving body side is disposed on said support plate, and an optical path that passes through the optical fiber disposed on said moving body and the optical fiber disposed on said support plate is changed by the movement of said moving body.

7. The moving mechanism as claimed in claim 3, wherein at least one optical fiber that penetrates said moving body and projects toward said support plate side is disposed on said moving body, at least one optical fiber that projects toward said moving body side is disposed on said support plate, and an optical path that passes through the optical fiber disposed on said moving body and the optical fiber disposed on said support plate is changed by the movement of said moving body.

8. An electronic device including said moving mechanism as claimed in claim 1.

9. An electronic device including said moving mechanism as claimed in claim 2.

10. An electronic device including said moving mechanism as claimed in claim 3.

11. An electronic device including said moving mechanism as claimed in claim 4.

\* \* \* \* \*

UNITED STATES PATENT AND TRADEMARK OFFICE
CERTIFICATE OF CORRECTION

PATENT NO. : 6,487,337 B1
DATED : November 26, 2002
INVENTOR(S) : Takashi Yamanaka et al.

It is certified that error appears in the above-identified patent and that said Letters Patent is hereby corrected as shown below:

<u>Title page,</u>
Insert item:
-- [30]  Foreign Application Priority Data
November 26, 1999 [JP] Japan  ...  11-336063 --.

Signed and Sealed this

Eleventh Day of May, 2004

JON W. DUDAS
*Acting Director of the United States Patent and Trademark Office*